2,801,119
KNOB

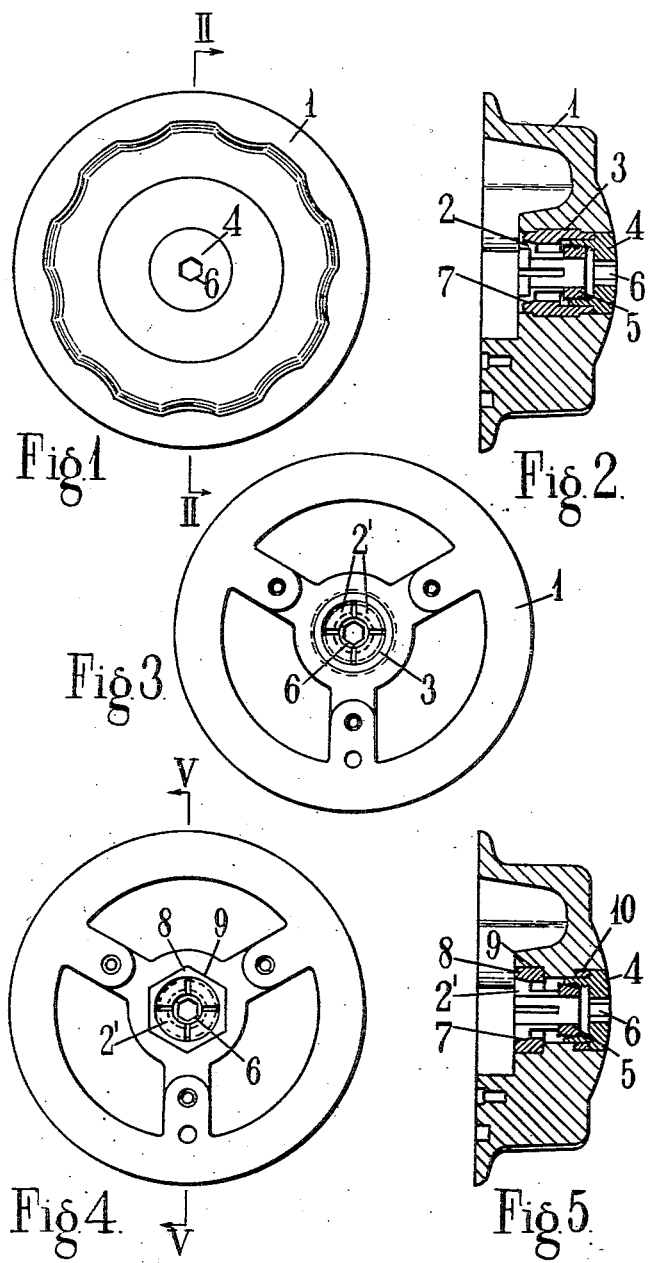

Henry Paul-Huhne, Ponders End, England, assignor to
The British Electric Resistance Company Limited,
Ponders End, England Application April 8, 1954, Serial No. 421,837

Claims priority, application Great Britain
January 11, 1954

3 Claims. (Cl. 287—53)

This invention consists in a knob, handwheel, or like rotary end fitting for a spindle, comprising a longitudinally split contractile sleeve or collet for the spindle and a coaxial contracting member adapted to encircle the collet and contract the latter by relative axial movement.

Preferably, the contracting member comprises a sleeve having a conical inner surface and the collet is formed with a complementary inner surface. If desired, the contracting member may be fixed in the fitting; for example, in the case of a moulded plastic knob, it may be moulded in, suitably with the aid of a key. Alternatively it may be detachable, and secured to the fitting, in use, by screw mechanism provided for effecting the aforesaid axial movement. In the latter case, the contracting member may seat loosely in a recess in the fitting and be so shaped as to prevent relative rotation whilst the collet is being tightened.

Two convenient constructions are illustrated in the accompanying drawings, of which:

Figure 1 is a front view of a first construction,

Figure 2 is a sectional view on the lines II—II of Figure 1,

Figure 3 is a rear view of a modification which is substantially the identical structure of the embodiment shown in Figures 1 and 2, Figure 4 is a rear view of a second construction and Figure 5 is a sectional view on the line V—V of Figure 4.

As shown in Figures 1 and 2, there is provided a moulded plastic knob 1 formed with a central bore in which is keyed a sleeve 3. Seated within the sleeve is a collet 2 having a polygonal head extending from a boss 5 and, in screw threaded engagement with the outer surface of the boss is a tubular screw 4 formed with an Allen head 6. Where the collet 2 seats against the sleeve 3, the engaging surfaces are conical, as shown at 7. The sleeve 3, at its outer end, serves as a seating for the head of the screw 4 so that, when the screw is tightened, the collet 2 is pulled into the sleeve 3 and contracted in consequence of the conical engaging surfaces 7.

In Figure 3 there is illustrated a modification which is identical with the structure of Figures 1 and 2, except a collet 2′ has a circular head as shown instead of a polygonal head as described with reference to Figures 1 and 2.

In the arrangement of Figures 4 and 5 there is illustrated another embodiment of my invention in which there is provided the same collet 2′ shown in Figure 3 extending from the externally threaded tubular boss 5, the outer surface of the free ends of the fingers defining the collet constituting a longitudinally split conical surface 7. The latter rests against the complementary inner surface of a sleeve 8 having a polygonal outer surface and the sleeve in turn rests in a complementary recess 9 formed in the centre of the inner face of the moulded plastic knob 1. Extending inwards from the front of the knob is the concentric tubular screw 4 threaded on its inner surface and engaging with the boss 5. The screw is formed with a Phillips, Allen, slotted hexagonal or other convenient head shown as an Allen head 6, resting against a bearing member 10. The direction of taper of the conical surface 7 is such that when the screw is tightened, the collet is pulled into the sleeve and contracted. To accommodate different diameters of spindle, interchangeable collets may be employed.

In the case of the construction shown in Figures 1 and 2, the head of the collet is circular, suitably polygonal, to prevent rotation relative to the knob in the event of binding on a spindle when removing the knob, so as to facilitate loosening the collet by twisting. In the modification of Figure 3 the collet head is circular.

I claim:

1. A knob having a front and back with a substantially axial bore extending therethrough from front to back; means fixed in said bore for fixedly mounting the knob on the end of a spindle; said means comprising a sleeve having an inner surface tapering inwardly from adjacent the back of the knob toward the axis of the bore; a contractable collet, having a head portion at one end and a boss at its opposite end, slidably mounted in said sleeve with its head portion adjacent the back of the knob; said head portion fitting in a recess adjacent the back of the knob and being shaped with respect to said recess to prevent rotation of the collet relative to said sleeve; said collet having a longitudinal surface tapering from adjacent the head portion in the same direction as said inner tapering sleeve surface and being in slidable contact therewith; said boss having an outer axially screw threaded portion; a tubular screw in said bore having screw threads on an inner surface thereof threadedly engaging the screw threads on said boss; a shoulder on said tubular screw; and axially fixed bearing means within said bore surrounding said screw and axially slidably abutting said shoulder on the screw for holding the tubular screw in fixed axial position when the screw is rotated in a direction to contractably slide the collet within said sleeve.

2. The knob of claim 1 in which the bearing means in said bore comprises the end of said sleeve adjacent the front of said knob.

3. The knob of claim 1 in which the bearing means in said bore is formed by a separate annular bearing member mounted in the bore and spaced from the sleeve and is adjacent the front of said knob.

References Cited in the file of this patent

UNITED STATES PATENTS

| 1,114,653 | Starin | Oct. 20, 1914 |
| 1,491,342 | Eckhardt | Apr. 22, 1924 |
| 1,886,224 | Redinger | Nov. 1, 1932 |
| 2,465,471 | Packer | Mar. 29, 1949 |
| 2,572,890 | Serafin | Oct. 30, 1951 |

FOREIGN PATENTS

| 449,454 | Italy | of 1949 |